United States Patent [19]

Allred et al.

[11] 4,312,623
[45] Jan. 26, 1982

[54] HIGH THROUGH-PUT MATERIALS HANDLING SYSTEM AND METHOD

[75] Inventors: James K. Allred, Salt Lake City; Edward B. Quinn, Bountiful, both of Utah

[73] Assignee: Eaton-Kenway, Inc., Salt Lake City, Utah

[21] Appl. No.: 20,783

[22] Filed: Mar. 15, 1979

[51] Int. Cl.³ .............................................. B65G 1/04
[52] U.S. Cl. ................... 414/786; 414/136; 414/231; 414/273; 414/286
[58] Field of Search ............... 414/136, 264, 273, 283, 414/284, 786, 231, 286

[56] References Cited

U.S. PATENT DOCUMENTS

| | | |
|---|---|---|
| 3,049,247 | 8/1962 | Lemelson . |
| 3,402,836 | 9/1968 | Debrey et al. . |
| 3,480,162 | 11/1969 | Saul . |
| 3,497,088 | 2/1970 | Lemelson ........................ 414/283 X |
| 3,719,287 | 3/1973 | Billingsley et al. . |
| 3,734,311 | 5/1973 | Thompson et al. . |
| 3,958,102 | 5/1976 | Burt . |
| 4,007,843 | 2/1977 | Lubbers et al. ...................... 414/273 |
| 4,074,120 | 2/1978 | Allred et al. ...................... 414/264 X |
| 4,120,629 | 10/1978 | Christian ............................. 414/136 |

OTHER PUBLICATIONS

"Six Hundred Products . . . ", *Mehanical Handling*, London, England, Nov. 1970, p. 49.
"A Victory Over Variety", *Modern Materials Handling*, USA, vol. 27, No. 11, Nov. 1972, p. 64.

*Primary Examiner*—Leslie J. Paperner
*Attorney, Agent, or Firm*—H. Ross Workman; Rick D. Nydegger

[57] ABSTRACT

A system and method for automated materials handling is disclosed wherein palletized goods are stored and retrieved with maximum through-put. This system is particularly applicable for pallets of comparatively large size. In accordance with this system and method, input loads are queued prior to displacement onto a continuous conveyor serviced by a plurality of S/R machines. The queued loads are metered onto the conveyor on a far to near aisle correspondence basis and are simultaneously exchanged for output loads at each of the aisle locations. The method includes compensation for circumstances where outputs exceed inputs and where inputs exceed outputs by empty pallet management.

4 Claims, 2 Drawing Figures

HIGH THROUGH-PUT MATERIALS HANDLING SYSTEM AND METHOD

BACKGROUND

1. Field of the Invention

The present invention relates to an automated materials handling system and method for high through-put storage and retrieval of goods.

2. The Prior Art

Automated materials handling systems are well known in the art and typically provide for storage and retrieval of palletized goods. Computer controlled automated storage systems such as that disclosed in U.S. Pat. No. 4,074,120 have recognized the value and importance of tracking goods stored so that the goods can be retrieved in accordance with a customer's order. The tracking is accomplished by identifying the goods at or near the input station and then delivering the goods to the pickup station for pickup and storage by the storage/retrieval (S/R machines).

It is also known to permit S/R machines to obtain input loads from a conveyor which transports the load in front of the storage array for pickup by the S/R machines. In accordance with this last mentioned method, palletized goods are conveyed in seriatim in front of the storage warehouse and as the goods approach a conveyor transfer pickup station, each load is detained sufficiently long at the conveyor transfer pickup station for it to be removed from the conveyor. The load is then picked up, transferred by the S/R machine to a pre-assigned storage address and there stored for later retrieval upon command.

Inasmuch as a plurality of loads are typically simultaneously conveyed along the conveyor adjacent the high rise storage, care must be taken to assure that there is sufficient space between the pallets so that the second pallet will not catch up with the first pallet while the first pallet is being detained for transfer to the pickup station for pickup by the S/R machine. For example, if the conveyor transfer time is, for example, 10 seconds, an interpallet spacing of about 15 feet is required if the conveyor rate is sixty feet per minute. One of the critical features in determining the spacing between the loads is the time necessary to transfer the load from the conveyor to the pickup location for the S/R machine. Once the minimum transfer time has been established, it has historically been possible to space each load from the other a sufficient distance that the first load has time to clear before the second load arrives.

While this prior art technique has worked acceptably on standard pallet sizes of approximately four feet square, enormous problems have resulted for pallets which are considerably larger. For example, a high rise storage system with conveyor input and output was designed for staging automobiles at the output of an automobile manufacturing assembly line. The automobiles are placed on a pallet 12 feet by 22 feet in size. The pallets were conveyed along a chain-driven conveyor at 60 feet per minute at spacings of 30 feet. Conveyor transfer cycle times were calculated to be 35 seconds and the S/R machines were constructed to have dual cycle times of 160 seconds and single cycle times of 101 seconds. Assuming five storage aisles in the high rise storage facility, given the foregoing parameters, the system should yield a total capacity of 110 to 125 loads per hour. Operated in accordance with the prior art techniques set forth above, it was discovered that the enlarged pallets frequently came into close encounter with preceding pallets engaged in transfer to the S/R machines. The close encounter resulted in a conveyor stop delaying the free flow of pallets and materially adversely affecting through-put. Actual through-put was found to be as low as 30 loads per hour. To space the loads farther apart, while potentially reducing delays due to conveyor stoppage, would clearly adversely affect the total through-put capacity of the system.

In accordance with prior art techniques, one possible solution to the problem is to provide a separate conveyor and associated drive for each separate aisle of the high rise storage. Clearly, however, separate conveyors and drives are extremely expensive and serve to further complicate the automated storage system.

BRIEF SUMMARY AND OBJECTS OF THE INVENTION

The present invention comprises an automated high rise materials handling system and method for materially improving load through-put by pre-assigning a far to near aisle-load assignment and simultaneously exchanging input loads and output loads at each aisle. The system is constructed so as to automatically provide for empty pallet management by assuring that every input station and every output station is filled with a pallet, whether full or empty, at every transfer.

Accordingly, it is primary object of the present invention to provide a novel materials handling system for improving load through-put.

It is another primary object of the present invention to provide an improved method for increasing the efficiency of an automated materials handling system having a plurality of S/R machines servicing a single continuous conveyor.

It is another object of the present invention to provide an improved system and method for queuing loads and metering the loads onto a conveyor serviced by a plurality of S/R machines for maximum through put.

Another valuable object of the present invention is to provide an improved system and method for accommodating maximum system efficiency when outputs exceed inputs and when inputs exceed outputs.

These and other objects and features of the present invention will become more fully apparent from the following description and appended claims taken in conjunction with the accompanying drawings.

DETAILED DESCRIPTION OF THE PREFERRED EMBODIMENTS

Figure 1:
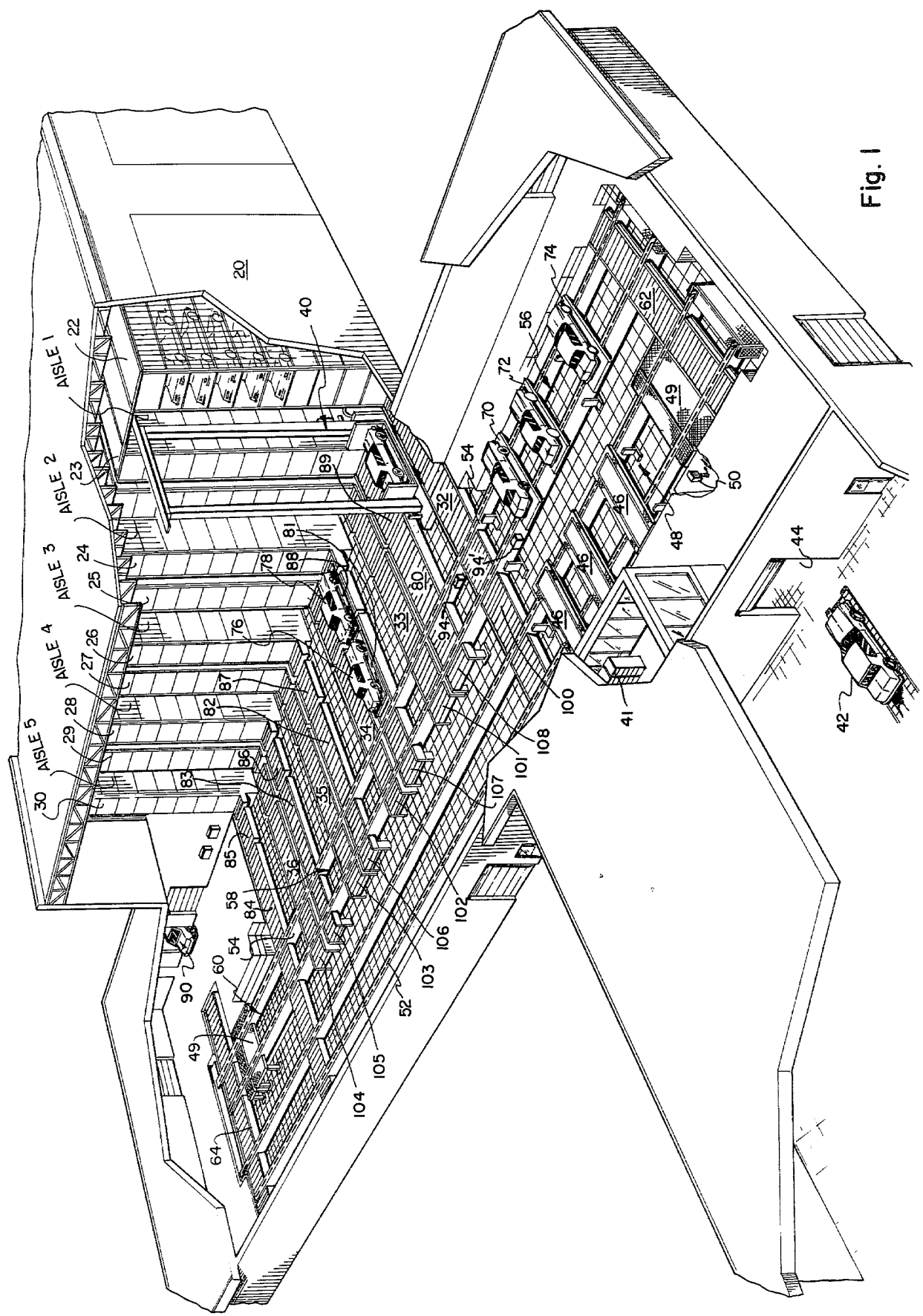
FIG. 1 is a schematic perspective of a preferred system embodiment of the invention.

Reference is now made to FIG. 1 which illustrates one presently preferred embodiment of the invention. As illustrated in FIG. 1, a high rise storage warehouse 20 comprises an array of storage bays 22–30. The storage bays 22–30 are separated by five parallel aisles 1–5. Clearly, while only five storage aisles are illustrated in FIG. 1, any suitable number of storage aisles and storage bin assemblies could be used. The storage bin assemblies 22–30 are typically constructed of metal rack which open into the corresponding aisles 1–5.

Each aisle is provided with a computer controlled storage/retrieval (S/R) machine 40, only one of which is illustrated in FIG. 1. The S/R machine 40 illustrated in aisle 1 of FIG. 1 is typical of all other S/R machines in the corresponding aisles 2-5. There are a number of S/R machine configurations which could be used with the present invention and the S/R machine configuration, per se, does not constitute part of the present invention.

While the system embodiment illustrated in FIG. 1 could be used to handle a wide variety of unit load goods, for convenience, the system will be described in connection with automobile storage and retrieval. Automobiles e.g. 42, fresh from the assembly line, enters the system at 44 and is driven onto a typical pallet 46. The pallet 46 is constructed of metal and has dimensions of approximately 12 feet (3.6 meters) by 22 feet (6.6 meters). The pallet 46 has been previously placed in the pallet queue generally designated 48. The pallet queue 48 is part of an elongated, essentially continuous conveyor 52 which runs essentially perpendicular to aisles 1-5. Conveyor 52 is preferably a chain-driven conveyor. When the pallets 46 reach the pallet queue area 48, platform 49 raises each pallet 46 off the moving chains and holds the pallet in position for on-loading. Platform 49 is preferably an air-driven pop-up section which engages the bottom of pallets 46. However, platform 49 may be raised and lowered by any one of a number of conventional devices such as, for example, a hydraulic ram or electric motor drive.

The high rise storage system is also provided with a second essentially continuous conveyor 54, conveyor 54 running essentially parallel to conveyor 52 and being similarly generally perpendicular to aisles 1-5. Conveyor 54 is preferably a chain-driven conveyor. Conveyor 54 is divided into three sections identified from right to left of FIG. 1 as the input queue 56, transfer area 58 and output queue 60. Conveyor 52 and conveyor 54 are connected at the input end by conveyor 62 and at the output end by conveyor 64. Conveyors 62 and 64 preferably chain-driven live roller conveyors.

It is pointed out that all of the queue areas including the empty pallet queue 48, the input queue 56 and the output queue 60 are provided with conventional air-driven pop-up sections, like platform 49 described above, that raise the pallets off the moving chains until de-energized, whereupon the pallets are placed back on the moving chains for displacement by the conveyor.

In accordance with the illustrated embodiment of the invention, the automobile 42 is placed on the pallet 46 while pallet 46 is held in the on-loading position by platform 49, and a description thereof entered at the computer terminal 50.

Each automobile delivered to the high-rise storage system is provided with a pre-printed tag exhibiting the Vehicle Identification Numbers (VIN). The VIN, destination and other pertinent data will be entered into a Central Processing Unit (CPU) 41 at the time of assembly. When the automobile 42 is placed on pallet 46, the vehicle will be identified using a conventional laser scanner which will read the VIN from the pre-printed tag. After the automobile has been driven onto pallet 46, the driver presses a button at terminal 50 which releases the automobile to the input conveyor system under direction of the control system in the CPU 41.

Thereafter, the pallet 46 is lowered onto the continuously moving conveyor 52 and displaced first to parallel conveyor 62 and thereafter is displaced onto conveyor 54 at the input queue 56. As illustrated in FIG. 1, loaded pallets 70 and 72 are illustrated in the queued position and loaded pallet 74 is moving into the queued position.

According to the present invention, loaded pallet 70 will not be released onto the conveyor 54 for displacement into the transfer area 58 until the number of pallets in the input queue 56 equals the number of aisles in the high rise storage system (i.e. five in the illustrated embodiment). During times of low input requirements, one or more empty pallets 46 may be queued up in the queue as a result of the operation of platform 49 of pallet queue 48 previously described and, thus, empty pallets 46 may be transferred to the input queue 56 in lieu of loaded pallets.

When the queue 56 is filled with five pallets (either loaded or unloaded), the pallets are metered onto the conveyor 54 at intervals which essentially correspond to the distance between aisles. Note that the distance between the pallets is not controlled by the speed of any transfer mechanism or by the speed of the S/R machine 40 and is not dependent upon the speed of conveyor 54.

Figure 2:
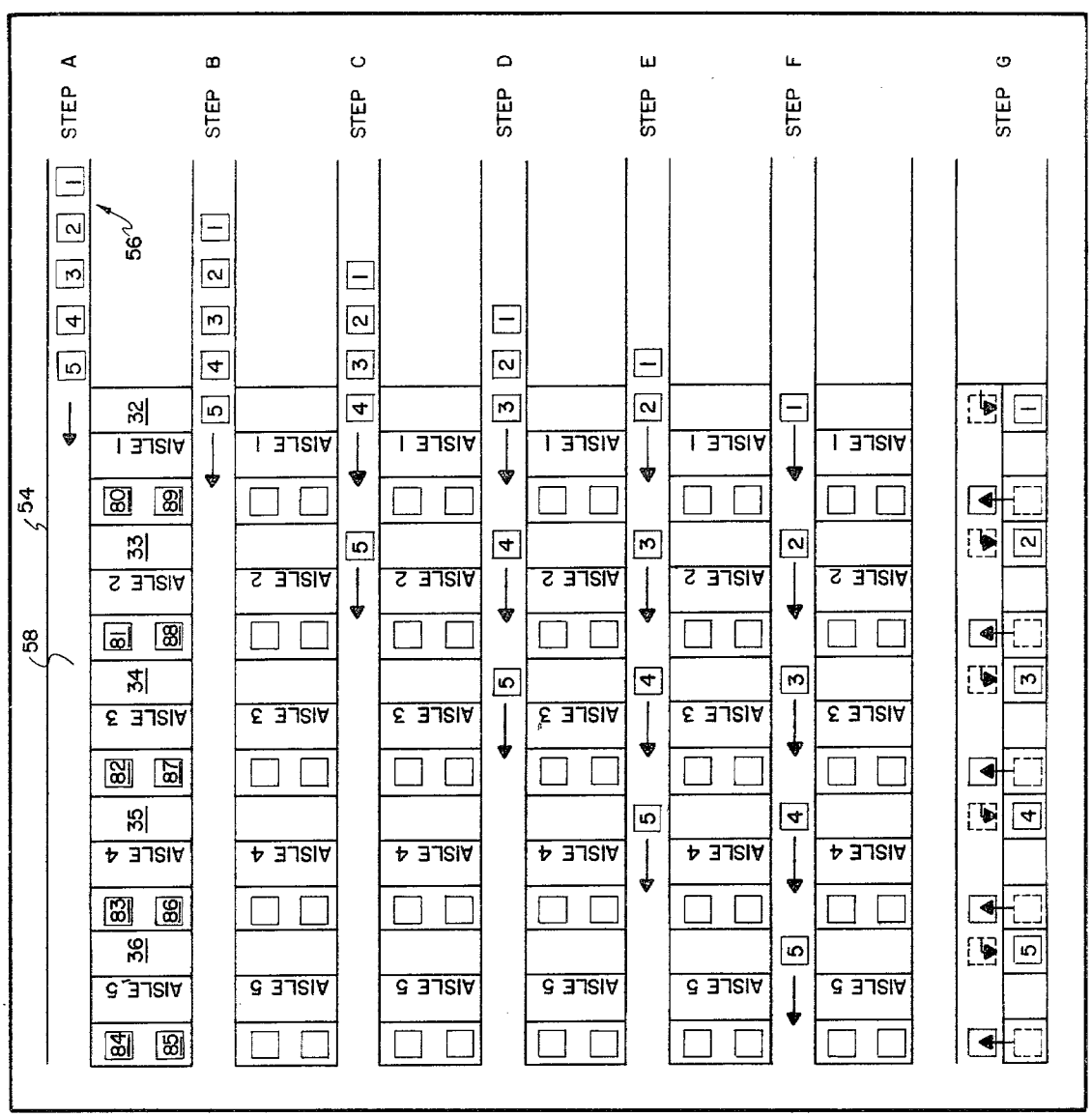
FIG. 2 diagramatically represents the steps in the flow of goods into and out of the system of FIG. 1.

The metering sequence is best understood by reference to FIG. 2 which schematically illustrates the movement of pallets from the input queue 56 to the transfer portion 58 of the conveyor 54.

With continued reference to FIG. 2, five pallets are illustrated schematically in the input queue 56. The loads are numbered 1-5 convenience. The transfer section 58 of the conveyor is illustrated immediately adjacent the S/R pickup stations 32-36 and the S/R deposit stations 80-84. Secondary deposit stations 85-89 are also schematically illustrated.

The loads are metered in accordance with the steps illustrated in FIG. 2. As illustrated in step A, the five loads are queued in the input queue 56 and all output stations 80-89 are filled. In step B, load 5 is released and permitted to progress along the conveyor section 58. As soon as load 5 has traveled essentially the distance between aisle 1 and aisle 2, load 4 is released as illustrated in step C. Similarly, when load 4 has traveled essentially the distance between aisles 1 and 2, load 3 is released as illustrated in step D and so on until each of the loads is carried simultaneously on the conveyor segment 58 as illustrated in step F. The metering of each load is accomplished by a metering device, schematiclly illustrated at 94. Metering device 94 may be one of any number of conventional devices for metering the input loads 1-5 at spaced intervals. For example, metering device 94 may be a photo-detector placed to detect the passing input loads and to release the next load or it may be an ultra-sonic distance measuring device positioned to detect the distance each load travels so as to release the following load at appropriate intervals. When loads 1-5 are aligned with the corresponding input stations 32-36, all of the five loads are simultaneously taken from the conveyor 58 and transferred to the corresponding input stations 32-36 by chain driven, live roller conveyors 100-104.

As illustrated in Step G of FIG. 2, at the same time as the five input loads are taken from conveyor 58 and transferred to the corresponding input stations 32-36 by the roller conveyors 100-104, output loads are taken from output stations 80-84 and transferred to conveyor 58 by conveyors 105-108, which results in essentially simultaneous exchange of input and output loads both to and from the conveyor 58. In accordance with the preferred embodiments of the invention, the conveyor 58 may be stopped long enough to permit the transfer of the loads to take place. However, it is presently preferred that air-driven pop-up squaring stop sections hold the pallets at the transfer location awaiting transfer engagement from the moving conveyor to the pickup station as described in order to keep the conveyor 54 continuously operating. If desired, a load straightener may be utilized in connection with the pop-up sections to assure alignment of the load for transfer.

With respect to the system and method described in connection with FIG. 2, it is particularly pointed out that the loads 1–5 are given pre-assigned aisle locations, far to near. Accordingly, random access of passing pallets is avoided along with the corresponding necessity of spacing the pallets sufficient distance to prevent close encounters during transfer time. Moreover, the simultaneous exchange of input and output pallets as illustrated in step G of FIG. 2 facilitates an essentially continuous operation with minimum spacing between pallets 1–5. Accordingly, maximum through-put is achieved even though transfer times onto and off of the conveyor 54 are long compared to the rate of travel of loads along the conveyor section 58.

Dual output stations 80–89 are illustrated in the preferred embodiments illustrated in FIGS. 1 and 2. While single output stations could be used, the dual output station has proven more effective in that an output load is always in the "ready" position for exchange with an input load on conveyor 58 even if the S/R machine has been delayed in retrieving the output load from storage.

The described system and method is equally effective whether input requirements exceed output requirements or vice versa. Note, for example, if input requirements exceed output requirements, the loads 1–5 illustrated in FIG. 2 will contain automobiles such as those illustrated at 70, 72 and 74 illustrated in FIG. 1. However, during periods of low output requirements, the CPU 41 causes the S/R machine 40 to fetch one or more empty pallets previously stored in storage bin assemblies 22–30 so that a pallet is provided at each of output stations 80–84 so that a transfer may take place. Hence, the output loads at output deposit stations 80–84 and secondary deposit stations 85–89 may include one or more empty pallets. Because a pallet is exchanged at each step G as illustrated in FIG. 2, whether loaded or empty, continuous movement of material is assured.

On the other hand, if output requirements should exceed input requirements, the loads 1–5 (FIG. 2) in the queue section 56 may include one or more empty pallets, such as pallet 46 illustrated in FIG. 1. At the same time, the output loads at each of deposit stations 80–89 will all include automobiles such as 76 and 78 illustrated in FIG. 1.

The output loads are conveyed by the transfer section 58 of the conveyor to the output queue section 60 (see FIG. 1) wherein the loads are removed. In the illustrated embodiment, automobiles are driven off the corresponding pallet and discharged from the system at 90 for shipment by rail or truck. The empty pallet is then taken via conveyor 64 to conveyor 52 and returned to the empty pallet queue 48.

From the foregoing, it can be appreciated that the described system and method accomodates maximum through-put of goods without requiring alteration of the spacing of the loads depending upon the speed of the transfer mechanism from the continuous moving conveyor to the S/R machine input station that might otherwise occur as a result of the large pallet sizes. Moreover, the maximized through-put can be obtained independent of whether input requirements exceed output requirements or whether output requirements exceed input requirements. Furthermore, for any number n of storage aisles, a corresponding number n of loads may be queued at the input staging area and assigned a particular storage aisle on a far to near correspondence. Synchronized off-load and on-load of the goods onto the single conveyor permits efficient use of the system without the expense and complication of multiple conveyor inputs.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A method for increasing the through-put of an automated materials handling system having a storage array comprising n aisles separating high rise storage bins, and S/R machine displaceable along the aisles and a pick up and a deposit station associated with each aisle, the method comprising the steps of:
   queuing n input loads at the inlet side of an elongated conveyor;
   assigning a storage address to the n input loads, which storage address is determined by a far to near aisle section sequentially applied to the n loads in the queue;
   metering the n loads at spaced intervals onto the conveyor means, the spacing generally corresponding to the space between aisles such that the first input load traverses the distance of the storage array to the nth aisle and the second input load traverses the distance of the storage array to the n-1 aisle, the third input load to the n-2 aisle and so on, the last input load metered corresponding to the first aisle of the storage array;
   essentially simultaneously exchanging input loads for output loads at said conveyor; and
   queuing the output loads at the outlet end of the conveyor means.

2. A method for increasing the through-put of an automated materials handling system as defined in claim 1 wherein said step of essentially simultaneously exchanging input loads for output loads comprise transferring the input loads from the conveyor to the pick up stations and transferring the output loads from the deposit stations to the conveyor.

3. A method for increasing the through-put of an automated materials handling system as defined in claim 2 wherein said step of essentially simultaneously exchanging input loads for output loads is preceded by the step of providing n previously stored output loads at the deposit stations.

4. A method for increasing the through-put of an automated materials handling system as defined in claim 3 wherein said step of queuing the output loads at the outlet end of the conveyor is preceded by the step of transferring the input loads from the pick up stations to one of the storage bins by means of the S/R machines.

* * * * *

UNITED STATES PATENT AND TRADEMARK OFFICE
CERTIFICATE OF CORRECTION

PATENT NO. : 4,312,623
DATED : January 26, 1982
INVENTOR(S) : James K. Allred, Edward B. Quinn It is certified that error appears in the above-identified patent and that said Letters Patent are hereby corrected as shown below:

Column 2, line 29, "it is primary" should be --it is a primary--

Column 3, lines 40-41, "Conveyors 62 and 64 preferably" should be --Conveyors 62 and 64 are preferably--

Column 4, line 10, "queued up in the queue" should be --queued up in the input queue--

Column 4, line 28, "numbered 1-5 convenience" should be --numbered 1-5 for convenience--

Column 4, line 45, "schematiclly" should be --schematically--

Column 6, line 51, "comprise" should be --comprises--

Signed and Sealed this

Third Day of August 1982

[SEAL]

Attest:

GERALD J. MOSSINGHOFF

*Attesting Officer*     *Commissioner of Patents and Trademarks*